US011252140B2

(12) United States Patent
Vudathu et al.

(10) Patent No.: US 11,252,140 B2
(45) Date of Patent: Feb. 15, 2022

(54) SYSTEMS AND METHODS FOR SECURELY CALLING APIS ON AN API GATEWAY FROM APPLICATIONS NEEDING FIRST PARTY AUTHENTICATION

(71) Applicant: JPMORGAN CHASE BANK, N.A., New York, NY (US)

(72) Inventors: Raghuram Vudathu, Downingtown, PA (US); Howard Spector, Woolwich, NJ (US)

(73) Assignee: JPMORGAN CHASE BANK, N.A., New York, NY (US)

(*) Notice: Subject to any disclaimer, the term of this patent is extended or adjusted under 35 U.S.C. 154(b) by 246 days.

(21) Appl. No.: 16/697,780

(22) Filed: Nov. 27, 2019

(65) Prior Publication Data

US 2020/0177576 A1 Jun. 4, 2020

Related U.S. Application Data

(60) Provisional application No. 62/773,860, filed on Nov. 30, 2018.

(51) Int. Cl.
*H04L 29/06* (2006.01)

(52) U.S. Cl.
CPC ...... *H04L 63/0807* (2013.01); *H04L 63/0876* (2013.01); *H04L 67/40* (2013.01)

(58) Field of Classification Search
CPC . H04L 63/0807; H04L 63/08; H04L 67/2895; H04W 12/06
USPC .......................................................... 726/4
See application file for complete search history.

(56) References Cited

U.S. PATENT DOCUMENTS

| 8,843,997 | B1* | 9/2014 | Hare | H04L 63/0815 726/3 |
|---|---|---|---|---|
| 9,083,770 | B1* | 7/2015 | Drose | H04L 43/087 |
| 9,882,892 | B1* | 1/2018 | Vogel | H04L 63/102 |
| 10,120,734 | B1* | 11/2018 | Doraiswamy | G06F 9/541 |
| 11,089,133 | B1* | 8/2021 | Patel | H04L 67/2895 |

(Continued)

OTHER PUBLICATIONS

Choyl et al., "Identity management with local functions", JP 2015-511348 A, 2015 (Year: 2015).*

(Continued)

*Primary Examiner* — Ondrej C Vostal
(74) *Attorney, Agent, or Firm* — Greenberg Traurig LLP

(57) ABSTRACT

Systems and methods for securely calling APIs on an API gateway from applications that need first party authentication are disclosed. In one embodiment, a method may include: (1) receiving, from a protected service, an authentication system token/cookie identifier, a first plurality of user identifying attributes, and a request to create an oAuth access token; (2) creating an attribute string; (3) encrypting the attribute string with a private key, resulting in the oAuth access token; (4) sending the oAuth access token to the first party computer application; (5) receiving, from the first party computer application, a request to access a backend service, a second plurality of user identifying attributes, and the oAuth access token; (6) decrypting the oAuth access token; (7) validating the decrypted oAuth access token; (8) inserting the authentication system token/cookie identifier into the request to access; and (9) communicating the request to the backend service.

18 Claims, 2 Drawing Sheets

(56) References Cited

U.S. PATENT DOCUMENTS

| | | | | |
|---|---|---|---|---|
| 2003/0023628 | A1* | 1/2003 | Girardot | G06F 9/547 715/202 |
| 2012/0331061 | A1* | 12/2012 | Lininger | G06F 30/13 709/205 |
| 2013/0086645 | A1* | 4/2013 | Srinivasan | H04L 63/0815 726/4 |
| 2014/0033291 | A1* | 1/2014 | Liu | H04L 63/08 726/7 |
| 2015/0089569 | A1* | 3/2015 | Sondhi | H04L 63/0807 726/1 |
| 2015/0150109 | A1* | 5/2015 | Bocanegra | H04L 63/0807 726/9 |
| 2016/0065563 | A1* | 3/2016 | Broadbent | H04L 63/0281 726/9 |
| 2017/0366348 | A1* | 12/2017 | Weimer | H04L 9/0618 |
| 2018/0075231 | A1* | 3/2018 | Subramanian | G06F 16/86 |
| 2018/0219846 | A1* | 8/2018 | Poschel | H04L 63/0807 |
| 2018/0302391 | A1* | 10/2018 | Jones | H04L 63/083 |
| 2019/0132307 | A1* | 5/2019 | Pitchaimani | H04L 63/0884 |
| 2019/0132321 | A1* | 5/2019 | Pitchaimani | H04W 12/06 |
| 2019/0372962 | A1* | 12/2019 | Maria | H04L 63/108 |
| 2020/0021573 | A1* | 1/2020 | Kondarev | H04L 63/108 |
| 2020/0076794 | A1* | 3/2020 | Boer | H04L 63/0869 |

OTHER PUBLICATIONS

Dierks et al., "The Transport Layer Security (TLS) Protocol Version 1.2", RFC 5246, 2008 (Year: 2008).*
Fielding et al., "Hypertext Transfer Protocol", RFC 2616, 1999 (Year: 1999).*
Franks et al., "HTTP Authentication: Basic and Digest Access Authentication", RFC 2617, 1999 (Year: 1999).*
Heiland et al., "CTSC Recommended Security Practices for Thrift Clients: Case Study—Evernote", 2014 (Year: 2014).*
Microsoft Computer Dictionary, "gateway", 2002 (Year: 2002).*
Naveen, "Single-Sign on Using Social Networking Sites", 2014 (Year: 2014).*
Varonis, "What is OAuth? Definition and How it Works", 2018 (Year: 2018).*
Wikipedia, "OAuth", 2021 (Year: 2021).*

* cited by examiner

SYSTEMS AND METHODS FOR SECURELY CALLING APIS ON AN API GATEWAY FROM APPLICATIONS NEEDING FIRST PARTY AUTHENTICATION

RELATED APPLICATIONS

This application claims the benefit of U.S. Provisional Patent Application Ser. No. 62/773,860, filed Nov. 30, 2018, the disclosure of which is hereby incorporated, by reference, in its entirety.

BACKGROUND OF THE INVENTION

1. Field of the Invention

Embodiments generally relate to systems and methods for securely calling APIs on an API gateway applications that need first party authentication.

2. Description of the Related Art

Authentication systems, Single Sign On systems, and Active Directory systems provide centralized web access management systems that enable user authentication and single sign-on, policy-based authorization, identity federation, and auditing of access to Web applications and portals. The use of these systems has made it a common practice and industry standard to use tools and frameworks for first party authentication.

First party computer applications (e.g., mobile apps/web applications that are deployed in the same domain) cannot directly call Application Programmable Interfaces, or APIs (e.g., REST Services, or SOAP Services, etc.) hosted on an API Gateway due to the lack of an authentication and authorization concerns built into the API Gateway type tools. The services hosted on API Gateway and API Gateway itself, relies on an external entity or a layer such as SiteMinder or some other equivalent tools or frameworks to authenticate the user.

The integration of any authentication framework into API Gateway is not ideal because of many architectural reasons. For example: (1) the API Gateway is an appliance, not an Active Directory/SiteMinder type authentication software/service; (2) the API Gateway is stateless and does not maintain a state or a session or a user context for the logged in user (i.e., the API Gateway can maintain the user context for a stateless user using token references); (3) the API Gateway does not have a persistence layer built for application concerns; (4) the API Gateway is mainly designed for stateless systems, to route the requests, throttle the requests, terminate the SSL, protocol transformation and content-based routing; and (5) the API Gateway works mainly with oAuth tokens.

Typically, mobile applications and websites have an authentication system that protects all the calls going to the back-end or middleware systems. The authentication system intercepts the requests and checks for a certain type of data that can only be obtained after the user logs into the authentication system. If that certain type of data is not found, the request gets forwarded to an authentication system, which challenges the user to log in to the application with proper credentials.

In this set up, one cannot leverage the API Gateway without creating the authentication layer in front of the API Gateway.

The industry standard way of integrating with an API Gateway is either with 2 legged oAuth or 3 legged oAuth.

SUMMARY OF THE INVENTION

Systems and methods for securely calling APIs on an API gateway from applications that need first party authentication are disclosed. In one embodiment, in an API gateway comprising at least one computer processor, a method for securely calling APIs on an API gateway from computer applications that need first party authentication may include: (1) receiving, from a protected service, an authentication system token or an authentication system cookie identifier from an authentication system, a first plurality of user identifying attributes, and a request to create an oAuth access token, the request originating with a first party computer application; (2) creating the oAuth access token and an attribute string comprising at least one of the first plurality of user identifying attributes and the authentication system token or the authentication system cookie identifier; (3) encrypting the attribute string with a private key, resulting in the oAuth access token; (4) sending the oAuth access token to the first party computer application; (5) receiving, from the first party computer application, a request to access a backend service, a second plurality of user identifying attributes, and the oAuth access token; (6) decrypting the oAuth access token with the private key; (7) validating the decrypted oAuth access token; (8) inserting the authentication system token or the authentication system cookie identifier into the request to access; and (9) communicating the request to access and the authentication system token or the authentication system cookie identifier to the backend service.

In one embodiment, the first plurality of user identifying attributes may include at least one of a device mac id, a device manufacturer, a device geo-location, a device operating system, a device operating system version, a device IP address, a user profile id, and a user id. In one embodiment, the method may further include setting an expiration for the oAuth access token.

In one embodiment, the step of validating the decrypted oAuth access token may include verifying that the oAuth access token has not expired.

In one embodiment, the backend service may include a micro service, a SOA service, a REST service, a SOAP service, monolith service, a standard routine, a standard function, a lambda function, or a procedure.

In one embodiment, a plurality of the user identifying attributes may be concatenated in the attribute string in a random order, in a rotating order, etc.

In one embodiment, the step of validating the decrypted oAuth access token may include comparing the extracted values from the oAuth token to the second plurality of user identifying attributes.

In one embodiment, the backend service may call the authentication system to check if the authentication system token or the authentication system cookie identifier is valid, and the method may further include: receiving an error from the backend system in response to the authentication system token or the authentication system cookie identifier being invalid; and sending an access grant denied error to the first party computer application.

According to another embodiment, a system for securely calling APIs on an API gateway from computer applications that need first party authentication may include: a first party computer application; an authentication system; a protected service; an API gateway; and a backend service. The authentication system may authenticate a user logging in to the first party computer application, and may create a session and returns session details to the first party computer application. The protected service may receive a request involving the backend service from the first party computer application and a first plurality of user identifying attributes, and may call the API gateway to create an oAuth access token and the first plurality of user identifying attributes. The API gateway may create the oAuth access token and an attribute string comprising at least one of the first plurality of user identifying attributes and the authentication system token or the authentication system cookie identifier; may encrypt the attribute string with a private key, resulting in the oAuth access token; may send the oAuth access token to the first party computer application; may receive, from the first party computer application, a request to access the backend service, a second plurality of user identifying attributes, and the oAuth access token; may decrypt the oAuth access token with the private key; may validate the decrypted oAuth access token; may insert the authentication system token or the authentication system cookie identifier into the request to access; and may communicate the request to access and the authentication system token or the authentication system cookie identifier to the backend service.

In one embodiment, the first plurality of user identifying attributes may include at least one of a device mac id, a device manufacturer, a device geo-location, a device operating system, a device operating system version, a device IP address, a user profile id, and a user id.

In one embodiment, the API gateway may set an expiration for the oAuth access token.

In one embodiment, the API gateway may validate the decrypted oAuth access token by verifying that the oAuth access token has not expired.

In one embodiment, the backend service may include a micro service, a SOA service, a REST service, a SOAP service, monolith service, a standard routine, a standard function, a lambda function, or a procedure.

In one embodiment, a plurality of the user identifying attributes may be concatenated in the attribute string in a random order, in a rotating order, etc.

In one embodiment, the API gateway may validate the decrypted oAuth access token by comparing the extracted values from the oAuth token to the second plurality of user identifying attributes.

In one embodiment, the backend service may call the authentication system to check if the authentication system token or the authentication system cookie identifier is valid, and the API gateway may receive an error from the backend system in response to the authentication system token or the authentication system cookie identifier being invalid and may send an access grant denied error to the first party computer application.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for securely calling APIs on an API gateway from that need first party authentication, web applications and any type of UI applications that will need first party authentication. Embodiments may be extended to non-UI applications including, for example, IoT type devices, sensors and other similar devices trying to send or receive data from the middleware systems or backend servers.

Figure 1:
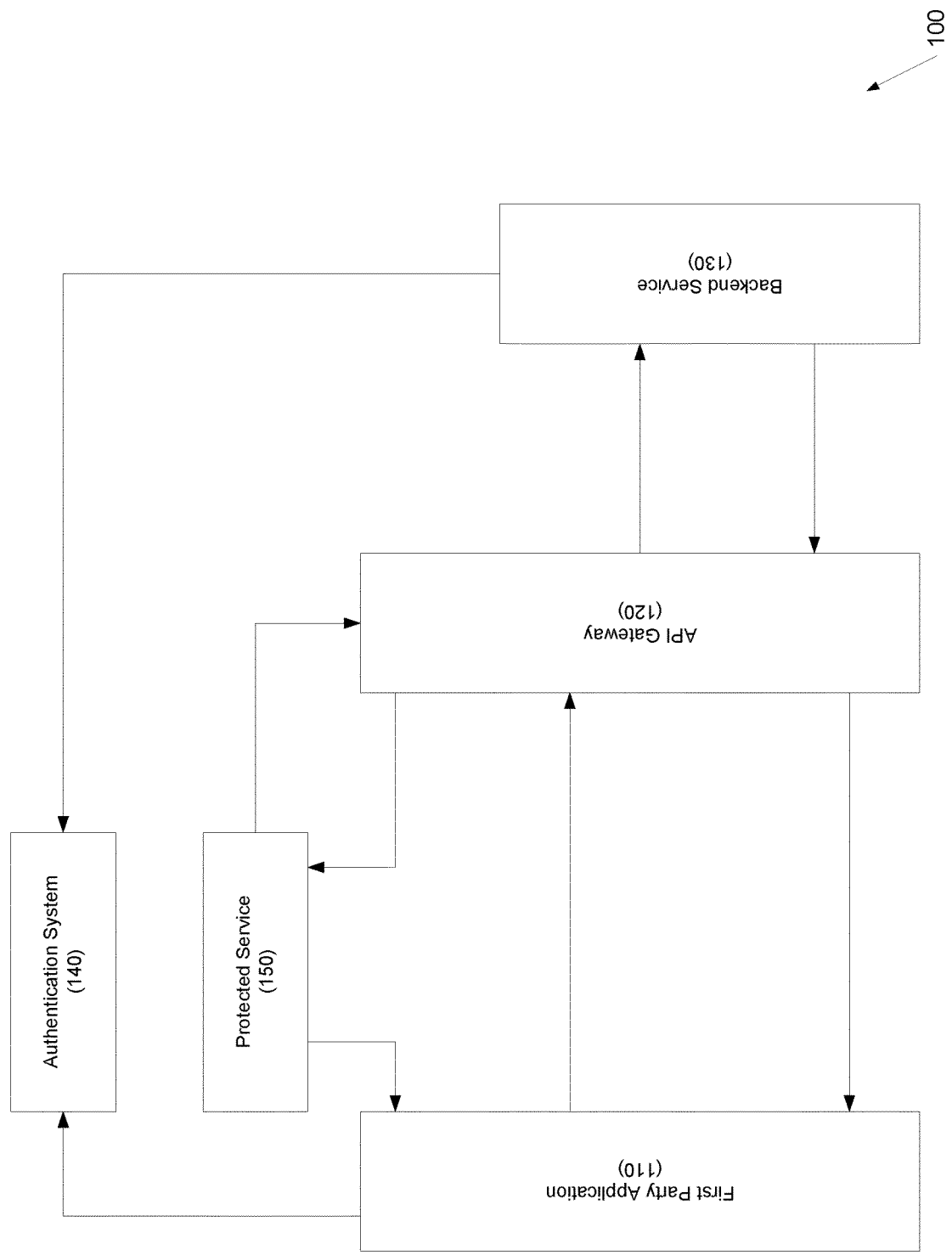
FIG. 1 depicts a system for securely calling APIs on an API gateway from applications that need first party authentication, according to one embodiment.

Referring to FIG. 1, a system for securely calling APIs on an API gateway from applications that need first party authentication is disclosed according to one embodiment. System 100 may include first party computer application 100, which may be a computer program or application executed on any suitable electronic device (e.g., smart phone, tablet computer, smart watch, notebook computer, desktop computer, workstation, Internet of Things (IoT) appliance, etc.

Examples of first party computer application 110 include mobile applications, web applications, fat client applications, thin client applications, desktop applications, native applications, IoT applications, IoT sensors, etc.

First party computer application 110 may communicate with API gateway 120, authentication system 140, and protected service 150, such as a Get oAuth Access Token service. In one embodiment, API gateway 120 may provide first party computer application 110 with access to one or more APIs, and may enable developers to create, publish, maintain, monitor, and secure APIs.

In one embodiment, authentication system 140 may be any suitable authentication system, including, for example, Site Minder, Active Directory, Single Sign On using SAML, Open ID, etc., or any similar system that authenticates the user and keeps and/or maintains the same state or session of the user in some form.

API gateway 120 may communicate with backend service 130 which may be, for example, a micro service, a SOA service, a REST service, a SOAP service, monolith service, a standard routine, a standard function, a lambda function, a procedure, etc.

Figure 2:
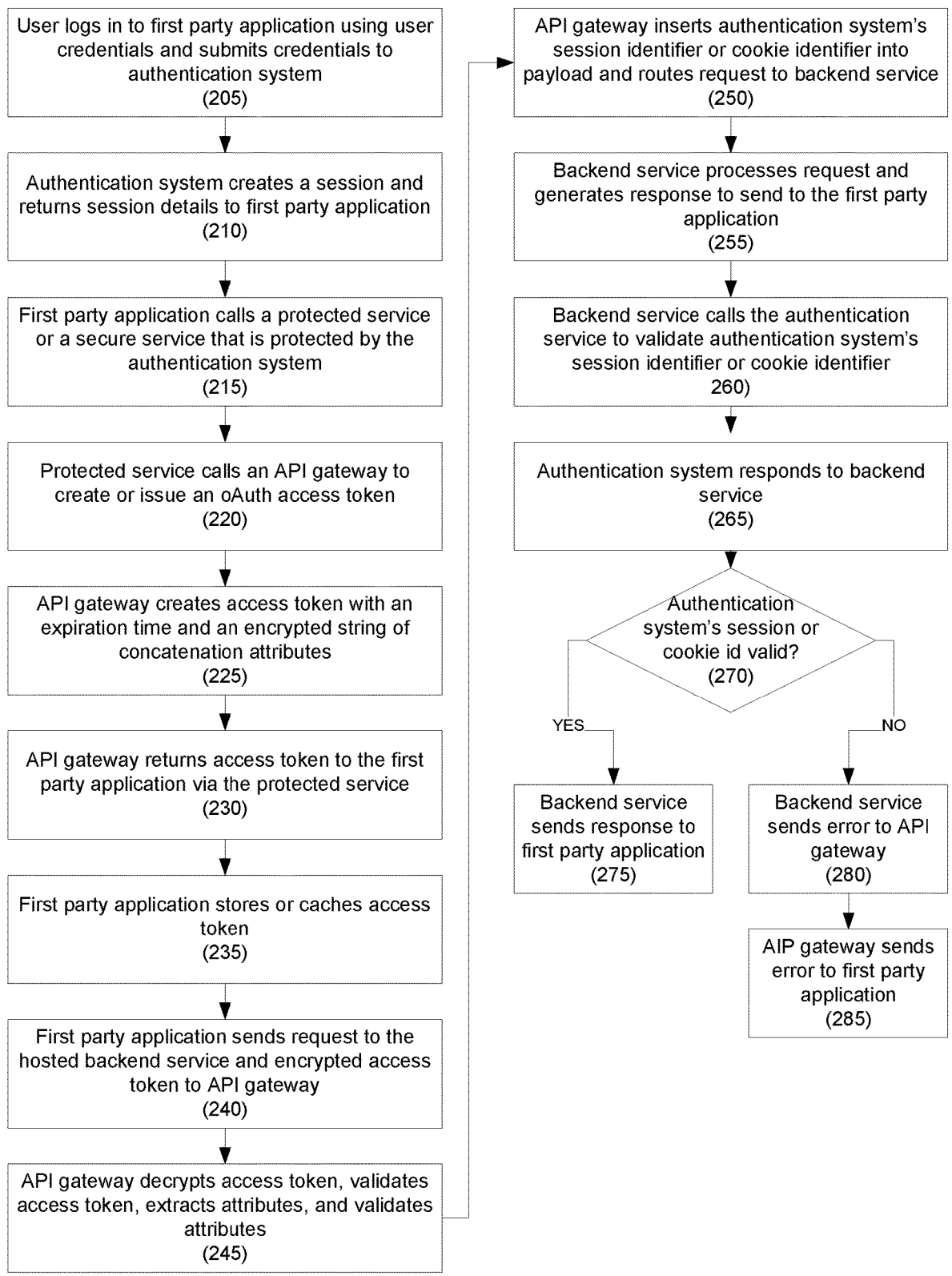
FIG. 2 depicts a method for securely calling APIs on an API gateway from applications that need first party authentication according to one embodiment.

Referring to FIG. 2, a method for securely calling APIs on an API gateway from applications that need first party authentication is disclosed according to one embodiment.

In step 205, a user may log in to a first party computer application using the user's credentials (e.g., username and password), and the first party computer application may submit the credentials to an authentication system.

In step 210, after the user is logged in successfully, the authentication system may create a session, and may return the session details to the first party computer application.

For example, once the user is authenticated, an authentication system token (e.g., authentication-system-token), an authentication system session identifier (e.g., authentication-system-session-id), or an authentication system cookie identifier (e.g., authentication-system-cookie-id) may be provided as part of the session details.

In step 215, the first party computer application may call a protected service that is protected by the authentication system. For example, if the first party computer application tries to call this protected service without actually logging in, the user will be re-directed to the authentication system, which challenges the user to log in with their login credentials (e.g., user name and password) and log the user to the application.

The protected service may be, for example, a Get oAuth Access Token service that may be deployed to a web server. An agent or other authentication plugin may be deployed that that intercepts the request coining to the protected service, and that checks if the authentication system token, the authentication system session identifier, or the authentication system cookie identifier is present and valid.

If the authentication system token, the authentication system session identifier, or the authentication system cookie identifier is missing, the request may be redirected to the authentication system.

The first party computer application may send certain one or more attributes that uniquely identify the user, such as the device mac id, the device manufacturer, the device geo-location, the device operating system (e.g., Android, iOS, Windows, Mac, Chrome, etc.), the device operating system version, a device IP address, a user profile id, a user id, etc. that identify the user and the device to the protected service in the request, to know/audit who the token is being issued to, for security purposes.

In step 220, the protected service may call the API gateway to create an oAuth access token using these attributes and an authentication system token and/or the authentication system cookie identifier.

In step 225, the API gateway may create an oAuth access token. In one embodiment, the API gateway may also (1) set an expiration time for the oAuth access token; (2) concatenate some or all the attributes (e.g., device id, device IP, user profile id, user id, the authentication system token or the authentication system cookie identifier, device mac id, device manufacturer, device geo-location, operating system (e.g., Android, iOS. Windows, Mac, Chrome, etc.), operating system version) in, for example, a default order, a random order, a rotating order, etc. to create an attribute string; and (3) encrypt the attribute string with a private key. The encrypted attribute string is the oAuth-access-token, also known as an "oAuth access token".

The private key may be secured and may not be shared with anyone. In one embodiment, no public key is generated.

In step 230, the encrypted oAuth access token may be returned to the first party computer application via the protected service as a response to the backend service call.

In step 235, the first party computer application may store or cache the oAuth access token so that it is available to the entire first application, so that any process in the first party computer application may access the oAuth access token.

In step 240, when the first party computer application is ready to call a backend service that is hosted on the API gateway that is not protected by any traditional authentication system, the first party computer application may send the request or payload details along with, for example, the device id, device IP, user profile id, user id, device mac id, device manufacturer, device geo-location, operating system (e.g., Android, iOS. Windows, Mac, Chrome, etc.), operating system version), operating system version, and the oAuth access token to the API gateway in plain text.

In step 245, when the API gateway receives the request, it may: (1) decrypt the oAuth access token with the private key; (2) check the validity of the oAuth access token—check the expiration timestamp of the oAuth access token (if the oAuth access token is expired, the API gateway will send an access grant denied error to the first party computer application); (3) unbundle the string and extract all the attributes (e.g., the device id, device IP, user profile id, user id, authentication system cookie id, device mac id, device manufacturer, device geo-location, operating system (e.g., Android, iOS. Windows, Mac, Chrome, etc.), operating system version, etc.); (4) compare the extracted values to the values received from the first party computer application in plain text at step 240.

If any of the values mismatch during the comparison, the API gateway will stop further processing and send an access grant denied error to first party computer application.

If all the values match and the oAuth access token is valid, then the API routes the request to the backend service.

In step 250, before routing the request or payload to the backend service, the API gateway may inject the authentication system cookie id or authentication system session id it extracted from the oAuth access token into the request or payload.

In step 255, the backend service may process the request or payload. For example, the request or payload may involve persisting data, calling other subsystems or downstream systems, making asynchronous calls, etc., and may create a response to send to the first party computer application.

In step 260, the backend service may call the authentication system to check if the authentication system cookie id or the authentication system session id is still valid (i.e., the user is still logged in and the user session is still active from the authentication system perspective). Steps 255 and 260 may be performed in parallel.

In step 265, the authentication system may provide a response to the backend service indication whether the authentication system cookie id or the authentication system session id is valid.

If, in step 270, the authentication system responds that the authentication system cookie id or the authentication system session id is valid, in step 275, the backend service may send the response back to the first party computer application.

If the authentication system responds that the authentication system cookie id or the authentication system session id is invalid (e.g. the user already logged out, or if the user session timed our, or if the browser session is closed for some other reason), in step 280, the backend system may send an error to the API gateway, and in step 285, the API gateway may, in turn, send an access grant denied error to the first party computer application.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method comprising:
   securely calling APIs that are on an API gateway from computer applications that need a first party authentication by:
   receiving, at the API gateway comprising at least one computer processor and from a protected service, an authentication system token or an authentication system cookie identifier from an authentication system, a first plurality of user identifying attributes, and a first request to create an oAuth access token, the first request originating with a first party computer application;
   creating, by the API gateway, an attribute string comprising at least one of the first plurality of user identifying attributes and the authentication system token or the authentication system cookie identifier;
   encrypting, by the API gateway, the attribute string with a private key, resulting in the oAuth access token;
   sending, by the API gateway, the oAuth access token to the first party computer application;
   receiving, by the API gateway and from the first party computer application, a second request to access a backend service, a second plurality of user identifying attributes, and the oAuth access token;
   decrypting, by the API gateway, the oAuth access token with the private key;
   validating, by the API gateway, the decrypted oAuth access token;
   inserting, by the API gateway, the authentication system token or the authentication system cookie identifier into the second request to access; and
   communicating, by the API gateway, the second request to access and the authentication system token or the authentication system cookie identifier to the backend service.

2. The method of claim 1, wherein the first plurality of user identifying attributes comprise at least one of a device mac id, a device manufacturer, a device geo-location, a device operating system, a device operating system version, a device IP address, a user profile id, and a user id.

3. The method of claim 1, further comprising:
   setting, by the API gateway, an expiration for the oAuth access token.

4. The method of claim 3, wherein the step of validating the decrypted oAuth access token comprises verifying that the oAuth access token has not expired.

5. The method of claim 1, wherein the backend service comprises a micro service, a SOA service, a REST service, a SOAP service, monolith service, a standard routine, a standard function, a lambda function, or a procedure.

6. The method of claim 1, wherein a plurality of the user identifying attributes are concatenated in the attribute string in a random order.

7. The method of claim 1, wherein a plurality of the user identifying attributes are concatenated in the attribute string in a rotating order.

8. The method of claim 1, wherein the step of validating the decrypted oAuth access token comprises comparing extracted values from the oAuth token to the second plurality of user identifying attributes.

9. The method of claim 1, wherein the backend service calls the authentication system to check if the authentication system token or the authentication system cookie identifier is valid, and further comprising:
receiving, by the API gateway, an error in response to the authentication system token or the authentication system cookie identifier being invalid; and
sending, by the API gateway, an access grant denied error to the first party computer application.

10. A system comprising:
a first party computer application;
an authentication system;
a protected service;
an API gateway comprising APIs that need a first party authentication; and
a backend service;
wherein:
the authentication system authenticates a user logging in to the first party computer application;
the authentication system creates a session and returns session details to the first party computer application;
the protected service receives a first request involving the backend service from the first party computer application and a first plurality of user identifying attributes;
the protected service calls the API gateway to create an oAuth access token and the first plurality of user identifying attributes;
the API gateway creates an attribute string comprising at least one of the first plurality of user identifying attributes and an authentication system token or an authentication system cookie identifier;
the API gateway encrypts the attribute string with a private key, resulting in the oAuth access token;
the API gateway sends the oAuth access token to the first party computer application;
the API gateway receives, from the first party computer application, a second request to access the backend service, a second plurality of user identifying attributes, and the oAuth access token;
the API gateway decrypts the oAuth access token with the private key;
the API gateway validates the decrypted oAuth access token;
the API gateway inserts the authentication system token or the authentication system cookie identifier into the second request to access; and
the API gateway communicates the second request to access and the authentication system token or the authentication system cookie identifier to the backend service.

11. The system of claim 10, wherein the first plurality of user identifying attributes comprise at least one of a device mac id, a device manufacturer, a device geo-location, a device operating system, a device operating system version, a device IP address, a user profile id, and a user id.

12. The system of claim 10, wherein the API gateway sets an expiration for the oAuth access token.

13. The system of claim 12, wherein the API gateway validates the decrypted oAuth access token by verifying that the oAuth access token has not expired.

14. The system of claim 12, wherein the backend service comprises a micro service, a SOA service, a REST service, a SOAP service, monolith service, a standard routine, a standard function, a lambda function, or a procedure.

15. The system of claim 10, wherein a plurality of the user identifying attributes are concatenated in the attribute string in a random order.

16. The system of claim 10, wherein a plurality of the user identifying attributes are concatenated in the attribute string in a rotating order.

17. The system of claim 10, wherein the API gateway validates the decrypted oAuth access token by comparing extracted values from the oAuth token to the second plurality of user identifying attributes.

18. The system of claim 10, wherein:
the backend service calls the authentication system to check if the authentication system token or the authentication system cookie identifier is valid;
the API gateway receives an error from the backend system in response to the authentication system token or the authentication system cookie identifier being invalid; and
the API gateway sends an access grant denied error to the first party computer application.

* * * * *